United States Patent Office.

E. C. MERRILL, OF CHARLESTON, VERMONT.

Letters Patent No. 97,671, dated December 7, 1869.

---

IMPROVED ABRADING AND POLISHING-WHEEL.

---

The Schedule referred to in these Letters Patent and making part of the same.

---

*To all whom it may concern:*

Be it known that I, E. C. MERRILL, of Charleston, in the county of Orleans, and State of Vermont, have invented an Improvement in Abrading-Wheels; and I do hereby declare that the following is a description of my invention, sufficient to enable those skilled in the art to practise it.

My invention relates to the manufacture of artificial abrading-tools, such as grinding-wheels, hones, &c.; and The invention consists in the employment of what I term "brown emery," as a principal ingredient in the formation of such abrading-tools, this brown emery consisting of about seventy-two parts of pure silica, and about twenty-eight parts of oxide of iron, oxide of manganese, aluminum, and lime.

The material being moistened and subjected to pressure, the other matters form a cementitious bond to the silica, and when made into an artificial stone, in the form required for the abrading-tool, the softer material gives way, and leaves the cutting-faces of the silica at all times prominent, the softer material aiding but slightly in the reducing-process, but yet, doing so to some extent, and rendering it necessary to employ but a small quantity of other cementitious matter than that contained in the brown-emery.

This brown emery possesses many of the peculiar and distinctive qualities of European emery, not so hard, but having clear, sharp cutting-points, and being peculiar in its physical characteristics and crystal structure, some particles being much harder than others, and of a suitable form for cutting, rendering it well adapted for abrading purposes.

I find the brown emery existing as a granular mineral deposit, its grains being rendered nearly uniform in size by aqueous action, and I utilize the material by combining it with any suitable cementitious matter, and moulding it into the shape required, by pressure.

I claim, as a new article of manufacture, factitious abrading-wheels or other tools, having their cutting properties due in whole or in part to the employment in their composition of the material named.

E. C. MERRILL.

Witnesses:
FRANCIS GOULD,
S. B. KIDDER.